(12) United States Patent
Okada et al.

(10) Patent No.: US 11,928,544 B2
(45) Date of Patent: Mar. 12, 2024

(54) ARTICLE MANAGEMENT SYSTEM, READING DEVICE, ARTICLE MANAGEMENT METHOD, AND NON-TRANSITORY COMPUTER-READABLE STORAGE MEDIUM

(71) Applicant: Panasonic Intellectual Property Management Co., Ltd., Osaka (JP)

(72) Inventors: Shinichi Okada, Osaka (JP); Akifumi Nagao, Osaka (JP); Kou Inoue, Osaka (JP); Takaaki Sato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/987,227

(22) Filed: Nov. 15, 2022

(65) Prior Publication Data

US 2023/0081727 A1    Mar. 16, 2023

Related U.S. Application Data

(63) Continuation of application No. PCT/JP2021/006120, filed on Feb. 18, 2021.

(30) Foreign Application Priority Data

May 29, 2020   (JP) ................................ 2020-094972

(51) Int. Cl.
    *G06K 7/10*        (2006.01)
(52) U.S. Cl.
    CPC ................................ *G06K 7/10366* (2013.01)
(58) Field of Classification Search
    CPC .................................................. G06K 7/10366

(Continued)

(56) References Cited

U.S. PATENT DOCUMENTS

| 2002/0007325 A1 | 1/2002 | Tomon |
| 2007/0057789 A1* | 3/2007 | Hamerly ................ G06Q 50/04 340/572.1 |

(Continued)

FOREIGN PATENT DOCUMENTS

| JP | 2002-150241 | 5/2002 |
| JP | 2009-301356 | 12/2009 |

(Continued)

OTHER PUBLICATIONS

International Search Report dated Apr. 27, 2021 in corresponding International Application No. PCT/JP2021/006120.

*Primary Examiner* — Daniel A Hess
(74) *Attorney, Agent, or Firm* — Wenderoth, Lind & Ponack, L.L.P.

(57) ABSTRACT

An article management system includes an acquirer and a management unit. The acquirer is configured to acquire identification information and management information. The identification information is information read from an electronic tag by the reading device in each of a plurality of bases in a distribution channel for an article, the electronic tag being attached to the article and storing the identification information. The management information is information collected in association with the identification information in a corresponding one of the plurality of bases, the management information relating to management of the article. The management unit is configured to manage the article with reference to the identification information and the management information which are acquired by the acquirer in each of the plurality of bases.

15 Claims, 8 Drawing Sheets

(58) Field of Classification Search
USPC .......................................................... 235/451
See application file for complete search history.

(56) References Cited

U.S. PATENT DOCUMENTS

| | | | |
|---|---|---|---|
| 2009/0309705 A1 | 12/2009 | Kimura | |
| 2011/0248827 A1 | 10/2011 | Bertoncini et al. | |
| 2016/0357937 A1* | 12/2016 | Walter | G06Q 10/083 |
| 2019/0198786 A1 | 6/2019 | Shimizu et al. | |
| 2021/0018926 A1* | 1/2021 | Lee | G05D 1/0234 |

FOREIGN PATENT DOCUMENTS

| | | |
|---|---|---|
| JP | 2011-65331 | 3/2011 |
| WO | 2018/051860 | 3/2018 |

* cited by examiner

FIG. 7

| | COMMUNICATION MODE | 4 | 8 | 12 | 16 | 20 | 24 | 28 | 32 | 36 | 40 | 44 | 48 | 52 | 56 | 60 | 64 | DATA LENGTH |
|---|---|---|---|---|---|---|---|---|---|---|---|---|---|---|---|---|---|---|
| FF11 (FF1) | ONLY PREAMBLE | | PREAMBLE <8> | | | | | | | | | | | | | | | 8 |
| FF12 (FF1) | TAG DETECTION | | PREAMBLE <8> | START BIT <4> | don't care <4> | | | | | | | | | | | | | 16 |
| FF13 (FF1) | FIXED LENGTH 8 bits WITHOUT CRC | | PREAMBLE <8> | START BIT <4> | CORRE-CTION BIT <4> | ID1 <8> | | | | | | | | | | | | 24 |
| FF14 (FF1) | FIXED LENGTH 8 bits | | PREAMBLE <8> | START BIT <4> | CORRE-CTION BIT <4> | ID1 <8> | | CORRE-CTION BIT <4> | CRC <4> | | | | | | | | | 32 |
| FF15 (FF1) | FIXED LENGTH 16 bits | | PREAMBLE <8> | START BIT <4> | CORRE-CTION BIT <4> | ID1 <8> | | CORRE-CTION BIT <4> | ID2 <8> | | CORRE-CTION BIT <4> | CRC <8> | | | | | | 48 |
| FF16 (FF1) | NORMAL | | PREAMBLE <8> | START BIT <4> | CORRE-CTION BIT <4> | ID1 <8> | | CORRE-CTION BIT <4> | ID2 <8> | | CORRE-CTION BIT <4> | ID3 <8> | CORRE-CTION BIT <4> | CRC <8> | | don't care <4> | 64 |

ARTICLE MANAGEMENT SYSTEM, READING DEVICE, ARTICLE MANAGEMENT METHOD, AND NON-TRANSITORY COMPUTER-READABLE STORAGE MEDIUM

CROSS-REFERENCE TO RELATED APPLICATIONS

The present application is a Bypass Continuation of International Application No. PCT/JP2021/006120 filed on Feb. 18, 2021, which is based upon and claims the benefit of priority to Japanese Patent Application No. 2020-094972, filed on May 29, 2020, the entire contents of both applications are incorporated herein by reference.

TECHNICAL FIELD

The present disclosure generally relates to article management systems, reading devices, article management methods, and non-transitory computer-readable storage media. The present disclosure specifically relates to an article management system for managing an article which is moved between a plurality of bases (or points) by using an electronic tag, a reading device to be applied to the article management system, an article management method for managing the article which is moved between the plurality of bases, and a non-transitory computer-readable storage medium configured to store a program which executes the article management method.

BACKGROUND ART

WO 2018/051860 (hereinafter referred to as "Patent Literature 1") discloses a manufacturing method of a Radio Frequency Identification (RFID) tag adoptable as a tag of a non-contact wireless communication device operated by electric power supplied from a radio signal (radio wave). The RFID tag manufactured by the manufacturing method includes an internal circuit formed by a coating method using a conductor layer made of a material included in a field effect transistor.

A RFID tag (an electronic tag) manufactured by, for example, a manufacturing method as disclosed in Patent Literature 1 may be attached to an article which is moved between a plurality of bases, for management of the article.

SUMMARY

It is an object of the present disclosure to provide an article management system configured to easily improve convenience of management of an article which is moved between a plurality of bases by using an electronic tag, a reading device, an article management method, and a non-transitory computer-readable storage medium.

An article management system according to an aspect of the present disclosure includes an acquirer and a management unit. The acquirer is configured to acquire identification information and management information. The identification information is information read from an electronic tag by a reading device in each of a plurality of bases in a distribution channel for an article, the electronic tag being attached to the article and storing the identification information. The management information is information collected in association with the identification information in a corresponding one of the plurality of bases, the management information relating to management of the article. The management unit is configured to manage the article with reference to the identification information and the management information which are acquired by the acquirer in each of the plurality of bases.

A reading device according to an aspect of the present disclosure is to be applied to the article management system and includes a reading unit and a communicator. The reading unit is configured to read the identification information from the electronic tag. The communicator is configured to transmit the identification information read by the reading unit to the acquirer.

An article management system according to an aspect of the present disclosure includes an acquirer and a management unit. The acquirer is configured to acquire identification information and management information. The identification information is information read from an electronic tag by a reading device in each of a plurality of points in a process in which an article is moved, the electronic tag being attached to the article and storing the identification information. The management information is information collected in association with the identification information in a corresponding one of the plurality of points, the management information relating to management of the article. The management unit is configured to manage the article with reference to the identification information and the management information which are acquired by the acquirer in each of the plurality of points.

An article management method according to an aspect of the present disclosure includes acquiring identification information and management information. The identification information is information read from an electronic tag by a reading device in each of a plurality of bases in a distribution channel for an article, the electronic tag being attached to the article and storing the identification information. The management information is information collected in association with the identification information in a corresponding one of the plurality of bases, the management information relating to management of the article. The article management method further includes managing the article with reference to the identification information and the management information acquired in the acquiring of the identification information and the management information in each of the plurality of bases.

A non-transitory computer-readable storage medium according to an aspect of the present disclosure is configured to store a program which causes one or more processors to execute the article management method.

BRIEF DESCRIPTION OF THE DRAWINGS

The figures depict one or more implementation in accordance with the present teaching, by way of example only, not by way of limitations. In the figures, like reference numerals refer to the same or similar elements.

FIG. 7 is a schematic view of an example of a frame format to be applied to the reading device.

DETAILED DESCRIPTION (1) Overview

Figure 1:
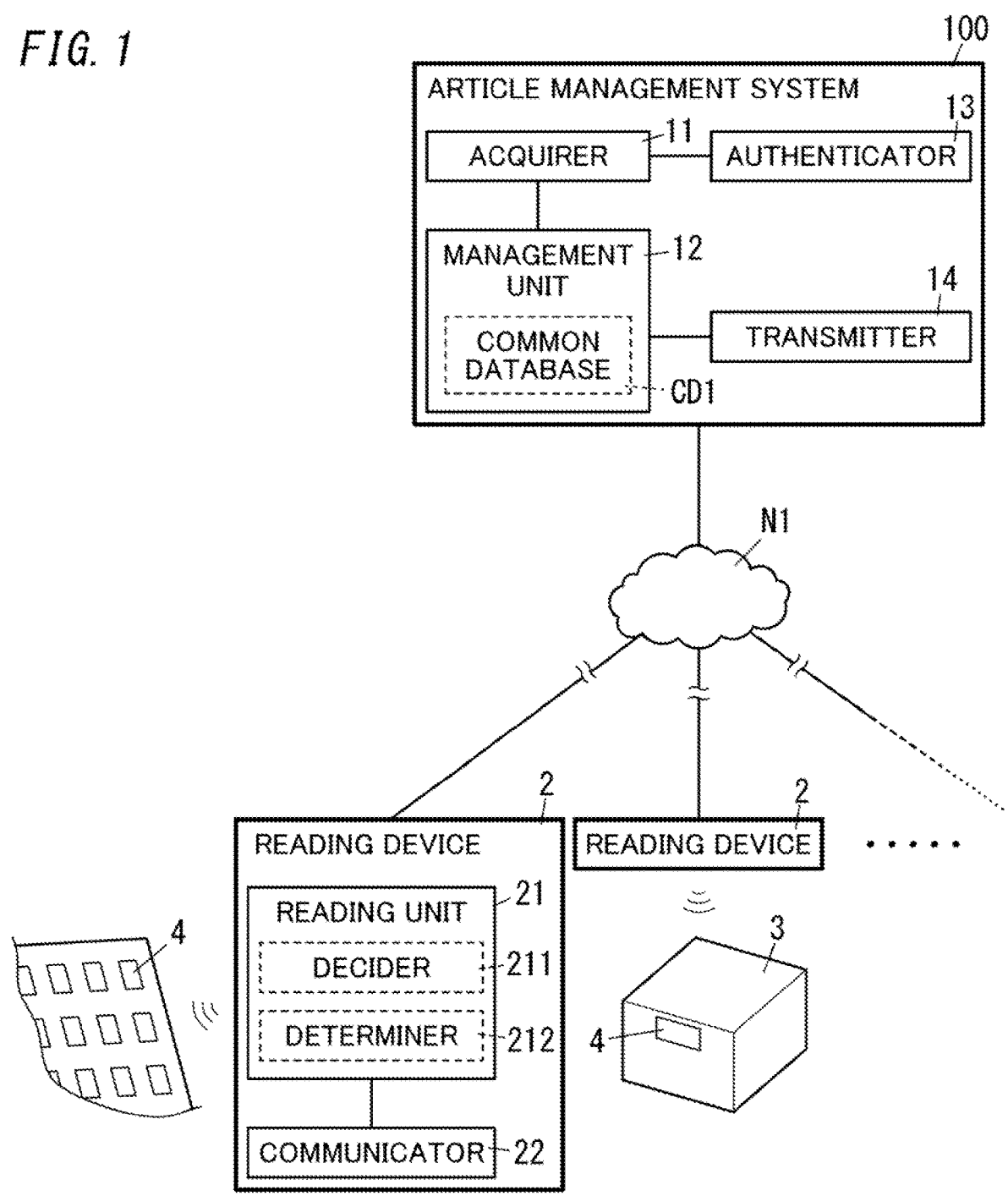
FIG. 1 is a block diagram of an overall configuration including an article management system according to an embodiment of the present disclosure.

An article management system 100 (see FIG. 1) of the present embodiment will be described below with reference to the drawings. Note that the embodiment below is a mere example of various embodiments of the present disclosure. The embodiment below may be readily modified in various manners depending on a design choice or any other factor without departing from the scope of the present disclosure. The drawings to be referred to in the following description of embodiments are all schematic representations. Thus, the ratio of the dimensions (including thicknesses) of respective constituent elements illustrated on the drawings does not always reflect their actual dimensional ratio.

The article management system 100 is a system for managing articles 3 which are moved between a plurality of bases P1 (see FIG. 2) by using electronic tags 4. In particular, in the present embodiment, the article management system 100 is used for management, that is, Supply Chain Management (SCM), of the articles 3 in a distribution channel for the articles 3. In the present embodiment, the plurality of bases P1 are facilities or places different from each other. Thus, for example, none of a plurality of points in an identical facility corresponds to the base P1.

Recently, visualization of restrictions and assignments in a supply chain and sharing information thus visualized between a plurality of players (e.g., business operators) in the supply chain are desired in the SCM. The information is in many cases shared based on, for example, a minimum management unit called Stock Keeping Unit (SKU) at the time of acceptance and placement of order of articles and stock management.

Articles are managed by, for example, providing the articles with Radio Frequency (RF) tags (electronic tags). The electronic tags are each an information medium including semiconductor memory therein and is configured to hold data written in memory by induction field or a radio wave in the semiconductor memory and to read the data from the memory by induction field or a radio wave in a non-contact manner.

The electronic tag has features that the electronic tag has a wide readable range, that the electronic tag is readable also when the electronic tag is at a location where the electronic tag cannot be seen, and that pieces of information are collectively readable from a plurality of electronic tags compared to barcodes heretofore used for management of articles. The electronic tag has the problems that the manufacturing process is complicated and manufacturing cost is high compared to the barcodes.

As a method for solving the problems, the electronic tag may be formed by a coating method. An electronic tag formed by the coating method is hereinafter referred to as a "coating-type tag". Unlike a heretofore used electronic tag manufactured by a vacuum technology, the coating-type tag requires no manufacturing device such as a vacuum device and can be manufactured in mass quantities by printing. Therefore, the coating-type tag has the advantages that the coating-type tag is manufacturable by a simple manufacturing process with reduced manufacturing cost compared to the heretofore used electronic tag.

The coating-type tag, however, has the problems that forming a complicated circuit in the coating-type tag is difficult, and in particular, configuring the coating-type tag such that internal memory in the coating-type tag is rewritable in a non-contact manner is difficult compared to the heretofore used electronic tag. That is, the coating-type tag has the problem that information required for management of an article cannot be written in the coating-type tag in a process in which the article is moved between a plurality of bases (or points), and thus, convenience of management of the article is poor. Thus, in the present embodiment, the article management system 100 described below improves convenience of management of the article 3 which is moved between the plurality of bases (or points) P1 even in the case of using the electronic tag 4 involving the problems mentioned above.

As shown in FIG. 1, the article management system 100 includes an acquirer 11 and a management unit 12.

The acquirer 11 is configured to acquire identification information and management information. In the present embodiment, the acquirer 11 receives the identification information and the management information transmitted from each of the plurality of bases P1, thereby acquiring the identification information and the management information for each base P1. For each of the plurality of bases P1, the number of groups of the identification information and the management information acquired by the acquirer 11 corresponds to the number of electronic tags 4 read by a reading device 2 in a corresponding one of the bases P1.

The identification information is information read from the electronic tag 4 by the reading device 2 in each of the plurality of bases P1 in a distribution channel for the articles 3, the electronic tag 4 being attached to each article 3 and storing the identification information. In other words, the identification information is information assigned to, and specific to, each electronic tag 4. In the present embodiment, the identification information is written into memory of each electronic tag 4 at the time of manufacturing the electronic tags 4.

In the present embodiment, examples of the article 3 include products, packing materials for packing products, and containers such as cardboard boxes for collectively packing a plurality of products. In the following description, the article 3 is assumed to be a product unless otherwise indicated.

The management information is information collected in association with the identification information at a corresponding one of the bases P1, the management information relating to management of the article 3. The management information may include, for example, information on a time at which the presence of the article 3 in the corresponding one of the bases P1 is confirmed (i.e., a time at which the electronic tag 4 is read by the reading device 2) or the location of the article 3. Here, the management information is not information acquired from the electronic tag 4 but is information collected at each base P1 through a channel different from the electronic tag 4. That is, in the present embodiment, the electronic tag 4 always stores only the identification information, and no new information is written into the electronic tag 4 in the process in which the article 3 is moved between the plurality of bases P1.

The management unit 12 is configured to manage the article 3 with reference to the identification information and the management information which are acquired by the acquirer 11 at each of the plurality of bases P1. In other words, the management unit 12 collectively manages the situations of the article 3 in the bases P1. The term "manages" as used in the present disclosure may include simply storing the identification information in association with the management information.

As described above, in the present embodiment, the management information can be managed by being associated with the identification information by the management unit 12 without being written into the electronic tag 4 in the process in which the article 3 is moved between the plurality of bases P1. Thus, the present embodiment has the advantage that convenience of management of the article 3 which is moved between the plurality of bases P1 is easily improved. Specifically, in the present embodiment, information in the distribution channel (i.e., supply chain) for the articles 3 can be visualized with reference to the identification information and the management information at each base P1 managed by the management unit 12. Thus, use of the information thus visualized provides the advantages that for not the SKU unit but each individual article 3, an enhancement of the SCM, for example, an improvement in work efficiency in the supply chain, suppression of excessive supply of articles 3 causing, for example, disposal loss, or an improvement in prediction accuracy of demand for the articles 3 is facilitated.

Moreover, in the present embodiment, the article 3 can be managed as described above even with the management information not being written into the electronic tag 4, and therefore, a coating-type tag can be adopted as the electronic tag 4. When the coating-type tag is adopted, the features of the electronic tag 4 which the barcode does not have are advantageously used, and the coating-type tag can be produced in mass quantities with reduced manufacturing cost compared to the heretofore used electronic tags.

(2) Details

The article management system 100 of the present embodiment will be described in detail below with reference to the drawings.

(2.1) Overall Configuration

Figure 2:
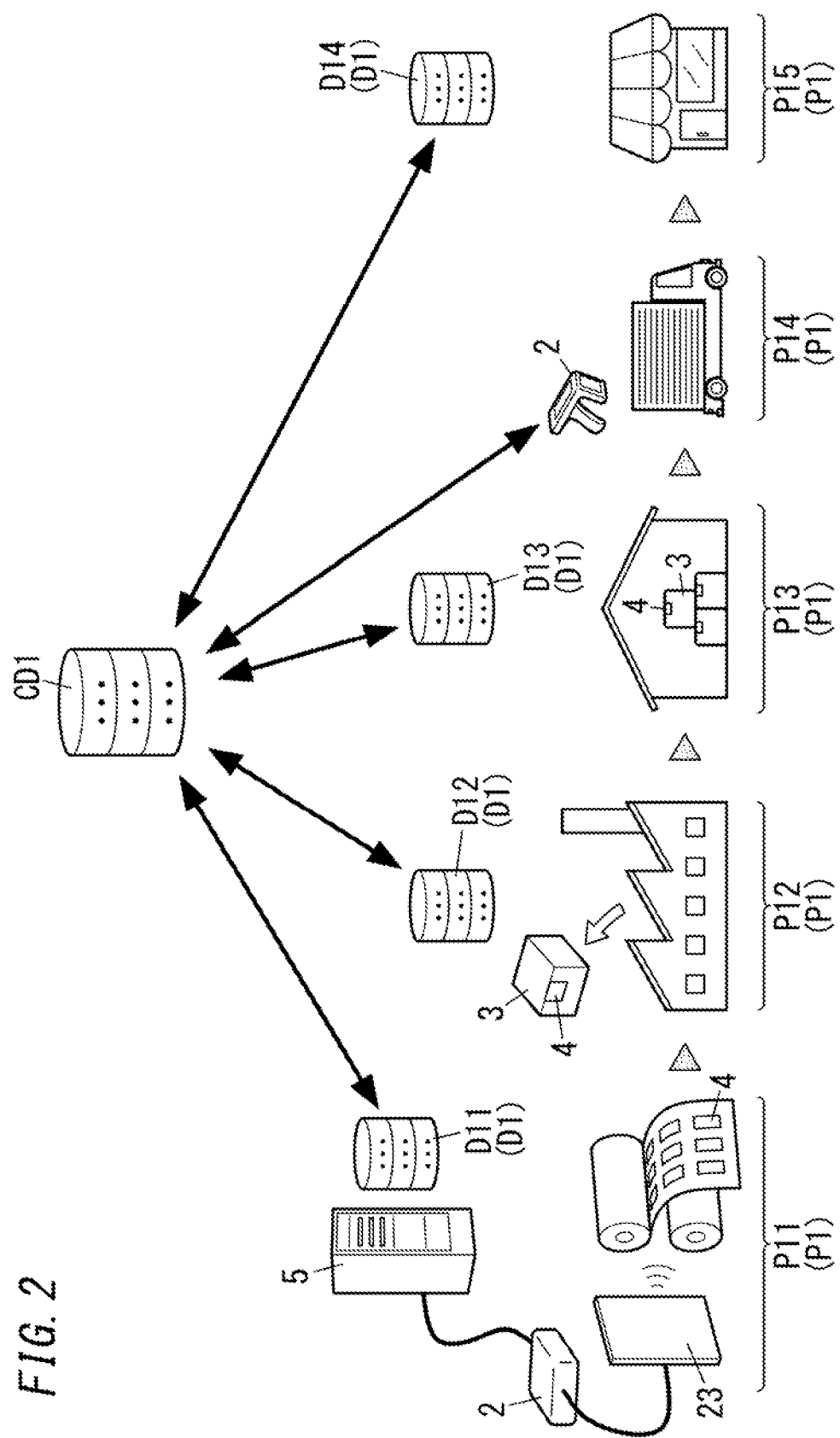
FIG. 2 is a schematic view of an example of a distribution channel for articles, where the article management system is applied to the distribution channel.

First of all, an overall configuration including an environment to which the article management system 100 is to be applied will be described with reference to FIG. 2. In the present embodiment, the article management system 100 is, as already described, used for management, that is, for the SCM of each article 3 (each product) in a distribution channel for the articles 3. In the present embodiment, the distribution channel for the articles 3 includes five bases P1 as shown in FIG. 2.

A first base P11 is a manufacturing plant for the electronic tags 4. A second base P12 is a manufacturing plant for the articles 3. A third base P13 is a warehouse in which the articles 3 are stored. A fourth base P14 is a business site of a transport service provider or a transportation vehicle which transports the articles 3. That is, unlike the other bases P1, the fourth base P14 is not limited to a fixed location but may be an unfixed location. A fifth base P15 is a retail establishment in which the articles 3 are put on sale.

The distribution channel for the articles 3 in the present embodiment will be briefly described below. First, in the first base P11, the electronic tags 4 are manufactured. The electronic tags 4 thus manufactured are transported to the second base P12. In the second base P12, the articles 3 are manufactured, and the electronic tags 4 are attached to the articles 3 thus manufactured. The articles 3, to which the electronic tags 4 have been attached, are transported to the third base P13. In the third base P13, the articles 3, to which the electronic tags 4 have been attached, are stored. The articles 3, to which the electronic tags 4 have been attached, are transported to the fifth base P15 in response to a request from a retail establishment. In the fourth base P14, the articles 3 to be transported to the fifth base P15 are temporarily collected. In the fifth base P15, the articles 3 thus transported are put on sale for customers. At the time of selling the articles 3, the electronic tags 4 may be detached from the articles 3.

(2.2) Reading Device and Electronic Tag

Next, the reading device 2 and the electronic tags 4 used together with the article management system 100 will be described with reference to FIGS. 1 to 7.

The electronic tags 4 are, for example, passive-type RF tags and include memory elements configured to store at least respective pieces of identification information on the electronic tags 4. In the present embodiment, at the time of manufacturing each electronic tag 4, the identification information is written into the memory element of the electronic tag 4. In the present embodiment, the electronic tag 4 is at least attachable to the article 3 in a state where the electronic tag 4 can be handled together with the article 3, and as a specific aspect in which the electronic tag 4 is attached to the article 3, various aspects are available. In the present embodiment, for example, the electronic tag 4 is a seal and is affixed to the article 3. Alternatively, the electronic tag 4 may be embedded in a package or wrapping paper of the article 3.

Figure 3:
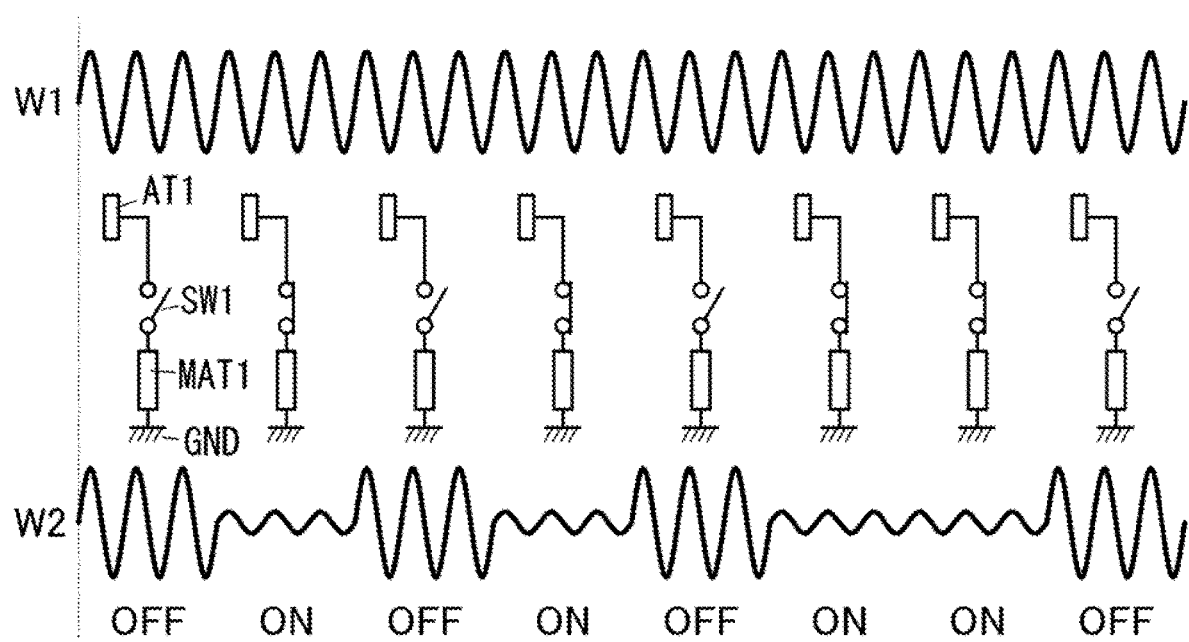
FIG. 3 is a schematic view of communication between an electronic tag and a reading device adopted in the article management system.

In the present embodiment, each electronic tag 4 performs backscatter communication with the reading device 2. Specifically, the electronic tag 4 performs the backscatter communication, as shown in FIG. 3, by connecting and disconnecting an antenna AT1 and a matching resistor MAT1 to and from each other by a switch SW1. The matching resistor MAT1 is connected to ground GND. The backscatter communication is a communication schema for transmitting data by changing a connection state of the impedance of the antenna AT1 with the matching resistor MAT1 by high-speed switching of the switch SW1 without generating a carrier wave by the electronic tag 4. Specifically, the electronic tag 4 does not output a radio wave from itself but rather reflects or absorbs a radio wave W1 transmitted from the reading device 2 by the antenna AT1, thereby transmitting data modulated such that the radio wave W1 is turned on/off. In the present embodiment, the electronic tag 4 absorbs the radio wave W1 in a state where the switch SW1 is ON and the antenna AT1 is thus connected to the matching resistor MAT1 as shown in FIG. 3 (see "ON" in FIG. 3). Moreover, the electronic tag 4 reflects the radio wave W1 in a state where the switch SW1 is OFF and the antenna AT1 is thus disconnected from the matching resistor MAT1 (see "OFF" in FIG. 3).

Here, when the reading device 2 monitors the magnitude of a reflection wave W2 from the electronic tag 4, a small reflection wave W2 can be observed by the reading device in a state where the electronic tag 4 switches on the SW1 and the antenna AT1 is thus connected to the matching resistor MAT1. In contrast, in a state where the electronic tag 4 switches off the switch SW1 and the antenna AT1 is thus disconnected from the matching resistor MAT1, the reading device 2 observes a large reflection wave W2. Thus, the reading device 2 observes the magnitude of the reflection wave W2, thereby receiving data from the electronic tag 4.

Here, as already described, the electronic tag 4 is a coating-type tag formed by a coating method. The coating-type tag has the advantages that the manufacturing cost is low and the coating-type tag can be produced in mass quantities, whereas the coating-type tag still has problems as described below. First, forming a complicated circuit in the coating-type tag is difficult, and therefore, the coating-type tag does not include a circuit (e.g., a regulator or a capacitor having a relatively large capacity of greater than or equal to 100 pF) that stabilizes the output of a rectifier circuit. Therefore, in the coating-type tag, electric power for driving the electronic tag 4 may become unstable. Second, the coating-type tag has a low data rate compared to the heretofore used electronic tag manufactured by a vacuum technology. Therefore, in the coating-type tag, if the state where the switch SW1 is ON and the antenna AT1 is thus connected to the matching resistor MAT1 continues, the coating-type tag cannot receive electric power from the radio wave W1 transmitted from the reading device 2, and electric power for maintaining a driving state of the electronic tag 4 may be insufficient.

The first problem is solved by manufacturing a coating-type tag by a coating method, and then, connecting a general-purpose capacitor having a relatively large capacity to the rectifier circuit by soldering to reduce instability of the electric power for driving the electronic tag 4, but in such a coating-type tag, the second problem can still not be solved.

Therefore, the problem is solved in the present embodiment by performing the communication between the electronic tag 4 and the reading device 2 as described below. That is, in the present embodiment, the electronic tag 4 uses a Return to Zero (RZ) code in the backscatter communication.

Figure 4:
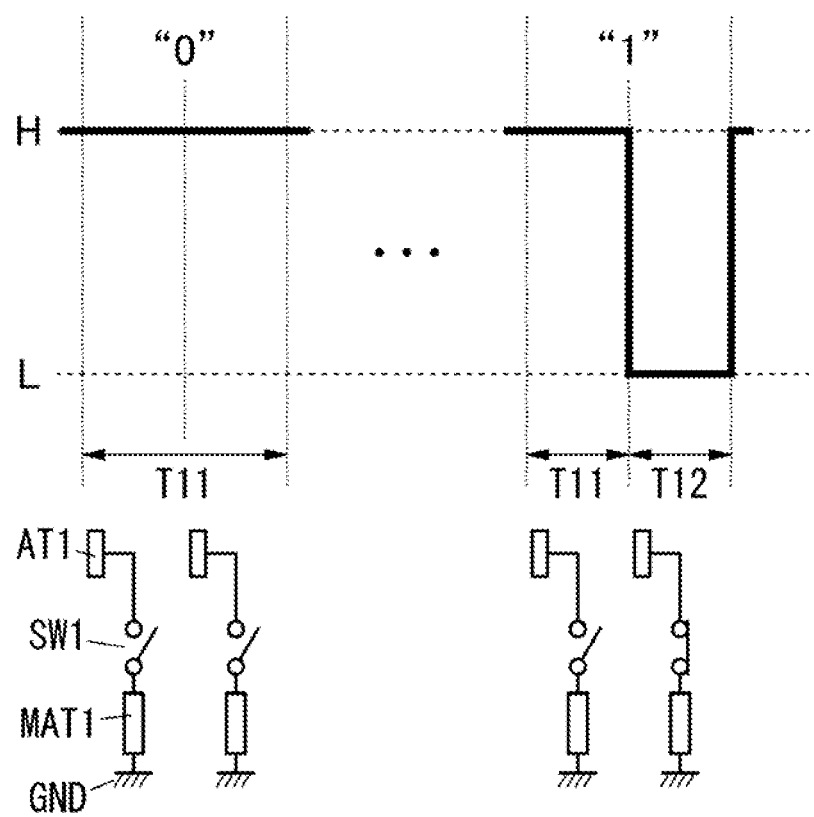
FIG. 4 is a schematic view of an example of transmission channel codes used in the communication between the electronic tag and the reading device.

Specifically, as shown in FIG. 4, the electronic tag 4 maintains a state where the switch SW1 is OFF and the antenna AT1 is thus disconnected from the matching resistor MAT1 in a bit representing "0". That is, in the bit width in the bit representing "0", the entirety of the bit width corresponds to a disconnection time period T11 for which the antenna AT1 is disconnected from the matching resistor MAT1 by the switch SW1. In contrast, in a bit representing "1", the electronic tag 4 once switches the switch SW1 from an OFF state to an ON state to connect the antenna AT1 to the matching resistor MAT1 and then returns the switch SW1 from the ON state to the OFF state to disconnect the antenna AT1 from the matching resistor MAT1. That is, in the bit width in the bit representing "1", the ratio of a connection time period T12 for which the switch SW1 is connected to the matching resistor MAT1 to the disconnection time period T11 is 1:1. Therefore, the total of disconnection time periods T11 is longer than the total of connection time periods T12 except for the case where all bits in a signal transmitted from the electronic tag 4 to the reading device 2 are "1". Moreover, even in the case where all the bits in the signal transmitted from the electronic tag 4 to the reading device 2 are "1", the total of the disconnection time periods T11 is substantially as long as the total of the connection time periods T12 and is less likely to be shorter than the total of the connection time periods T12.

Thus, the backscatter communication in the present embodiment adopts the following coding schema, for example, the RZ code as described above. In the coding schema, when the electronic tag 4 transmits a signal to the reading device 2, the disconnection time period T11 for which the antenna AT1 included in the electronic tag 4 is disconnected from the matching resistor MAT1 may vary within a range greater than or equal to the connection time period T12 for which the antenna AT1 is connected to the matching resistor MAT1. Thus, the present embodiment has the advantages that a time period during which electric power cannot be received from the radio wave transmitted from the reading device 2 can be reduced, and the electric power for maintaining the driving state of the electronic tag 4 is less likely to be insufficient.

The reading device 2 is a reader included in the RFID system and is a device configured to read the identification information from the electronic tag 4. In the present embodiment, the reading device 2 is disposed in each of the plurality of bases P1. In FIG. 2, the reading devices 2 are shown only in the first base P11 and the fourth base P14, and no reading devices 2 are shown in the other bases P1. Moreover, the reading device 2 disposed in the fourth base P14 is different from the reading devices 2 disposed in the other bases P1 and is not a fixed device installed in the corresponding one of the bases P1 but a portable device carried by an employee of the transport service provider.

As shown in FIG. 1, each reading device 2 includes a reading unit 21 and a communicator 22. Each reading device 2 further includes an antenna 23 (see FIG. 2) configured to output a radio wave toward the electronic tag 4 and receive the radio wave reflected off the electronic tag 4. Note that the reading device 2 disposed in the fourth base P14 includes an antenna 23 therein.

The reading unit 21 may be implemented as a computer system including one or more processors (microprocessors) and one or more memory elements. That is, the one or more processors execute one or more programs (applications) stored in the one or more memory elements to provide functions as the reading unit 21. In this embodiment, the program is stored in advance in the memory of a main computer 1. However, this is only an example and should not be construed as limiting. The program may also be downloaded via a telecommunications network such as the Internet or may be distributed after having been stored in a non-transitory storage medium such as a memory card.

The reading unit 21 has a function of reading the identification information from the electronic tag 4. Specifically, the reading unit 21 outputs a radio wave from the antenna 23 toward the electronic tag 4. Then, the reading unit 21 receives, by the antenna 23, a reflection wave (signal) from the electronic tag 4 activated by the radio wave thus output, and the reading unit 21 reads the identification information from the reflection wave thus received.

Here, the coating-type tag, which is the electronic tag 4, adopted in the present embodiment further has the following features in addition to the features described above. That is, the coating-type tag does not include a circuit configured to stabilize the output of the rectifier circuit, and due to a material for manufacturing the electronic tags 4, the electronic tags 4 may have different data rates (drive frequencies). In other words, the electronic tags 4 have different data rates (drive frequencies) specific to the respective electronic tags 4. This feature of the coating-type tag can also the feature of a coating-type tag provided with a retrofitted general-purpose capacitor as already described. It is assumed that the data rate of an electronic tag 4 having a high data rate and the data rate of the electronic tag 4 having a low data rate differ from each other by about several times. Therefore, at the time of communication between the coating-type tag and the reading device 2, the reading device 2 cannot give an instruction on a data rate to the coating-type tag or cannot predict the data rate.

Figure 5:
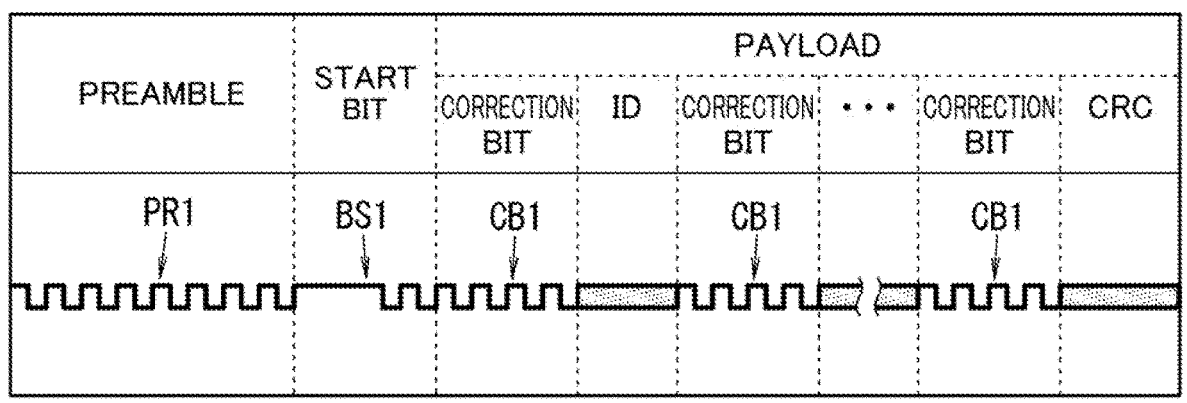
FIG. 5 is a schematic view of an example of a signal transmitted from the electronic tag.

To solve this problem, in the present embodiment, the electronic tag 4 is configured to transmit a signal as shown in FIG. 5, and the reading unit 21 includes a decider 211 and a determiner 212 described below.

When the electronic tag 4 is activated by receiving the radio wave output from the reading device 2, the electronic tag 4 transmits a preamble PR1, a start bit, and a payload (data) as shown in FIG. 5. The preamble PR1 is a bit sequence for synchronization of the communication between the electronic tag 4 and the reading device 2. In the present embodiment, the preamble PR1 is, for example, a bit sequence of eight bits of "11111111". In this case, the reading device 2 observes a state where a relatively large reflection wave W2 and a relatively small reflection wave W2 are alternatively repeated eight times. The start bit is a bit sequence which is inserted between the preamble PR1 and the payload and which notifies a transmission start of data. In the present embodiment, the start bit is a bit sequence of four bits of "0011". The payload is a bit sequence including the identification information ("ID" in FIG. 5), a plurality of correction bits CB1, and a Cyclic Redundancy Check (CRC) as an error-correcting code. In the present embodiment, the identification information is divided into 8-bit portions, but the division number does not have to be eight bits. The correction bits CB1 and bit sequences of divided identification information are alternately inserted into the payload.

The decider 211 decides the validity of data transmitted from the electronic tag 4. That is, the electronic tag 4 transmits the preamble PR1 in transmitting data to the reading device 2 as described above, and therefore, the decider 211 decides the validity of the data transmitted from the electronic tag 4 in accordance with whether or not the period of the preamble PR1 is within a predetermined range.

Prior to the decision by the decider 211, the reading unit 21 estimates the period of the preamble PR1 (i.e., the period of a plurality of bits included in the preamble PR1). The period of the preamble PR1 substantially corresponds to the data rate (drive frequency) of the electronic tag 4 at a time point at which the preamble PR1 is transmitted. Specifically, when the reading unit 21 receives the preamble PR1 by the antenna 23, the reading unit 21 detects edges of a plurality of pulses included in the preamble PR1. Next, the reading unit 21 measures, based on the detected edges of the plurality of pulses, a plurality of cycles of the edges. Then, the reading unit 21 computes (estimates), based on the plurality of measured cycles of the edges, the period of the preamble PR1. In an example, the reading unit 21 estimates an average value of the plurality of measured cycles of the edges as the period of the preamble PR1. Alternatively, the reading unit 21 may estimate a median value of a maximum value and a minimum value of the plurality of measured cycles of the edges as the period of the preamble PR1.

If the period of the preamble PR1 is within a predetermined range, the decider 211 decides that the signal is transmitted from the desired electronic tag 4. In this case, the reading unit 21 regards the data transmitted from the electronic tag 4 as valid and reads the data. In contrast, if the period of the preamble PR1 is out of the predetermined range, the decider 211 decides that the data is transmitted from an electronic tag (e.g., an electronic tag to which the article management system 100 is not targeted) different from the desired electronic tag 4. In this case, the reading unit 21 regards the data transmitted from the electronic tag 4 as invalid and discards the data.

The determiner 212 determines a capturing timing of data transmitted from the electronic tag 4. Specifically, the determiner 212 determines, based on the period of the preamble PR1, the capturing timing of the data transmitted from the electronic tag 4. In other words, the determiner 212 determines a sampling rate with reference to the estimated period (data rate) of the preamble PR1. Thus, in the present embodiment, the instruction on the data rate cannot be given to the electronic tag 4, but the capturing timing of the data is determined based on the data rate thus estimated, and thereby, the data transmitted from the electronic tag 4 can be read.

Here, the coating-type tag, which is the electronic tag 4, adopted in the present embodiment further has the following features in addition to the features described above. That is, since the coating-type tag does not include a circuit which stabilize the output of the rectifier circuit, the coating-type tag has the problem that the duty ratio varies or the data rate varies during communication with the reading device 2. This feature of the coating-type tag can also the feature of a coating-type tag provided with a retrofitted general-purpose capacitor as already described. As an example, the duty ratio is assumed to vary by about several tens of percentages during the communication with the reading device 2. This has the problem that capturing the data rate at the time of communication between the coating-type tag and the reading device 2 is difficult depending on how the duty ratio or the data rate varies.

Therefore, in the present embodiment, while the electronic tag 4 transmits data to the reading device 2, the electronic tag 4 transmits a plurality of correction bits CB1 for correcting the capturing timing of the data. In the present embodiment, the correction bit CB1 is, for example, but does not have to be, a bit sequence of 4 bits of "1111". Specifically, when the reading unit 21 receives the correction bit CB1 by the antenna 23, the reading unit 21 detects edges of a plurality of pulses included in the correction bit CB1. Next, the reading unit 21 measures, based on the detected edges of the plurality of pulses, a plurality of cycles of the edges. Then, the reading unit 21 computes (estimates), based on the plurality of measured cycles of the edges, the period of the correction bit CB1. The period of the correction bit CB1 substantially corresponds to the data rate (drive frequency) of the electronic tag 4 at a time point at which the correction bit CB1 is transmitted.

Then, the determiner 212 corrects, based on the period of the correction bit CB1 in a similar manner to the case of being based on the period of the preamble PR1, the capturing timing of the data transmitted from the electronic tag 4. In other words, the determiner 212 corrects the sampling rate with reference to the estimated periods of the plurality of correction bits CB1. Thus, the present embodiment has the advantage that even when the duty ratio or the data rate varies during the communication between the electronic tag 4 and the reading device 2, the capturing timing of the data is corrected based on the correction bit CB1, so that the data transmitted from the electronic tag 4 is easily stably read.

Figure 6:
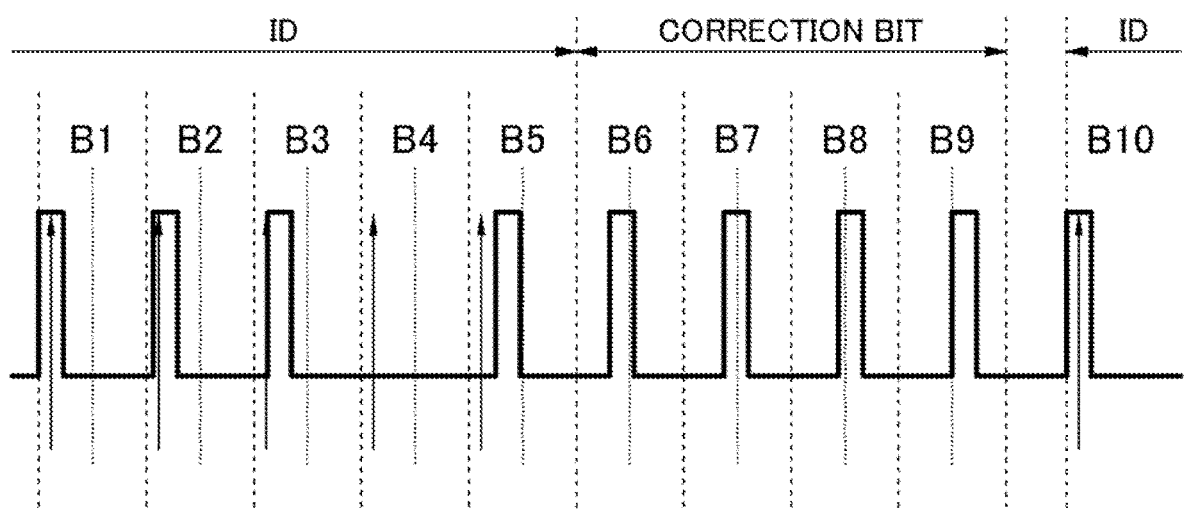
FIG. 6 is a schematic view of an example of data capturing by the reading device.

An example of correction using the correction bit CB1 will be described with reference to FIG. 6. In FIG. 6, "ID" represents a bit sequence of the identification information. In the example shown in FIG. 6, it is assumed that when there is a pulse in one bit width, this represents "1", and when there is no pulse in one bit width, this represents "0". Upward arrows in FIG. 6 represent capturing timings of data by the reading unit 21.

In the example shown in FIG. 6, in the bit sequence of the identification information, a pulse and the capturing timing of the data are not shifted from each other in a first bit B1 but are gradually shifted in a second bit B2, a third bit B3, and a fourth bit B4. In a fifth bit B5, the pulse and the capturing timing of the data are completely shifted from each other. Therefore, the fifth bit B5 is originally a bit representing "1", but since the pulse and the capturing timing of the data are shifted from each other, the reading unit 21 erroneously reads the fifth bit B5 as "0".

Thus, the determiner 212 corrects, based on the correction bits CB1 including a sixth bit B6 to a ninth bit B9 inserted after the fifth bit B5, the capturing timing of the data. Thus, in the bit sequence of the identification information inserted after the correction bits CB1, the shift between the pulse and the capturing timing of the data in a tenth bit B10 is eliminated. Note that in practice, the correction bits CB1 are preferably inserted before the pulse and the capturing timing of the data are completely shifted from each other as in the case of the fifth bit B5.

Moreover, in the present embodiment, the reading unit 21 reads, based on the start bit (see FIG. 5) inserted after the preamble PR1, a timing at which the plurality of correction bits CB1 are inserted. That is, the reading device 2 (reading unit 21) reads, based on the bit sequence BS1 (here, the start bit) between the preamble PR1 and a top correction bit CB1 of the plurality of correction bits CB1, the timing at which the plurality of correction bits CB1 are inserted. For example, the reading unit 21 reads whether the correction bits CB1 are inserted in every how many bits (e.g., 4 bits or 8 bits) in accordance with an aspect of the bit sequence of the start bit. This has the advantage that the reading unit 21 can grasp the timing at which the correction bits CB1 are inserted, and therefore, it is possible to easily prevent reading of the correction bits CB1 from being skipped.

Moreover, in the present embodiment, the reading device 2 can perform communication based on a plurality of frame formats FF1 according to the property of the electronic tag 4. Specifically, the reading device 2 communicates with the electronic tag 4 based on any one of six frame formats FF1 shown in FIG. 7. A first format FF11 is a frame format FF1 to be used when only the preamble PR1 is transmitted from the electronic tag 4. A second format FF12 is a frame format FF1 used only to detect the electronic tag 4. A third format FF13 is a frame format FF1 used when the fixed length of the identification information transmitted from the electronic tag 4 is 8 bits and includes no CRC. A fourth format FF14 is a frame format FF1 used when the fixed length of the identification information transmitted from the electronic tag 4 is 8 bits. A fifth format FF15 is a frame format FF1 used when the fixed length of the identification information transmitted from the electronic tag 4 is 16 bits. A sixth format FF16 is a normally used frame format FF1 which is used when the fixed length of the identification information transmitted from the electronic tag 4 is 24 bits.

The communicator 22 includes a communication interface connectable to, for example, a network N1, such as the Internet, or a database D1 (which will be described later). The communicator 22 has a function of transmitting the identification information read by the reading unit 21 to the acquirer 11. The communicator 22 further has a function of receiving update information transmitted from a transmitter 14 (which will be described later).

In the present embodiment, the communicator 22 transmits the identification information to the database D1 when the database D1 is provided between the article management system 100 and the reading device 2. The database D1 transmits the identification information to the acquirer 11 via the network N1 as described later. Thus, in this case, the communicator 22 indirectly transmits the identification information to the acquirer 11. On the other hand, the communicator 22 directly transmits the identification information to the acquirer 11 via the network N1 when the database D1 is not provided between the article management system 100 and the reading device 2.

(2.3) Article Management System

Next, the article management system 100 will be described with reference to FIG. 1. In the present embodiment, the article management system 100 is a server device provided in a base different from the plurality of bases P1. The article management system 100 may be implemented as, for example, a computer system including one or more processors (microprocessors) and one or more memory elements. That is, the one or more processors execute one or more programs (applications) stored in the one or more memory elements to provide functions as the article management system 100. The program is stored in advance in the memory element(s). However, this is only an example and should not be construed as limiting. The program may also be downloaded via a telecommunications network such as the Internet or may be distributed after having been stored in a non-transitory storage medium such as a memory card.

The article management system 100 includes the acquirer 11, the management unit 12, an authenticator 13, and a transmitter 14.

The acquirer 11 includes a communication interface connectable to the network N1. The acquirer 11 acquires the identification information read from the electronic tag 4 by the reading device 2 and the management information collected from a channel different from the reading device 2 via the network N1 for each base P1. The acquirer 11 is a subject that executes an acquisition step ST1 (see FIG. 8) described later.

The identification information is information read from the electronic tag 4 attached to the article 3 by the reading device 2. The identification information is information written in memory of each electronic tag 4 at the time of manufacturing the electronic tags 4 in a manufacturing plant for the electronic tags 4 and is an identifier specific to the electronic tag 4. In the present embodiment, the identification information is written in the memory of each electronic tag 4 as a random number depending on the fabricating process of the electronic tag 4.

The management information is information on management of each of articles 3 collected in association with the identification information in the base P1 where the identification information is read by the reading device 2. The management information may include, for example, article information on each of articles 3. As used in the present disclosure, the "article information" is information for identifying each of articles 3 and may be an identification code such as a Japanese Article Number (JAN) code used in Japan. Examples of the identification code include Electronic Product Code (EPC), a European Article Number (EAN) code in Europe and the like, and Universal Product Code (UPC) in USA and the like in addition to the JAN code. The EPC may include, for example, identification codes, such as Global Trade Item Number (GTIN), for individually identifying articles 3, and in addition, identification codes, such as Global Returnable Asset Identifier (GRAI), for management of resources (articles 3) of companies. Moreover, the article information is not limited to the information identifying the product type (kind) of each of the articles 3 but may include information such as serial information individually identifying each of the articles 3 of an identical product type. Thus, in the case of articles 3 of an identical product type, the articles 3 of the identical product type are individually identifiable based on the article information.

Moreover, the management information may include, for example, information required to enhance the SCM in each process of the distribution channel (supply chain) for the articles 3. For example, the management information may include items based on the specification of Electronic Product Code Information Services (EPCIS). Examples of the items include the date and hour at which the electronic tag 4 is read, the place where the electronic tag 4 is read, and the state where the electronic tag 4 is placed. Note that each article 3 is represented by a combination of article information given to the article 3 and the identification information on the electronic tag 4 attached to the article 3, of the items of the EPCIS. Moreover, for example, in the case of the manufacturing plant for the articles 3, the management information may include information and the like on a manufacturing line number, a person in charge of manufacturing, a material(s) adopted in the manufacturing, or a tool(s) used in the manufacturing.

Here, in the present embodiment, as shown in FIG. 2, the first base P11, the second base P12, the third base P13, and the fifth base P15 are respectively provided with a first database D11, a second database D12, a third database D13, and a fourth database D14. In the following description, the databases D11 to D14 are simply referred to as "databases D1" when they are not distinguished from one another. That is, in at least one base P1 of the plurality of bases P1, the database D1 is disposed which stores the identification information and the management information collected in the corresponding one of the plurality of bases P1.

The database D1 is included in a processing device 5 installed in each base P1. The processing device 5 includes, for example, a desktop or laptop personal computer, or a tablet computer, or the like. Note that in FIG. 2, the processing device 5 is shown only in the first base P11, and the processing devices 5 are not shown in the second base P12, the third base P13, and the fifth base P15.

Each processing device 5 (database D1) has a function of storing the identification information, which is transmitted from the reading device 2, in association with the corresponding management information. Moreover, each processing device 5 has a function of transmitting the identification information and the management information thus stored to the acquirer 11. That is, for each of the bases P1 provided with the databases D1, the acquirer 11 acquires the identification information and the management information from the processing device 5 (database D1) in the corresponding one of the bases P1.

The processing device 5 and the article management system 100 may be configured to communicate with each other in a wired manner (via a dedicated line) or communicate wirelessly based on a communication standard such as Wi-Fi (registered trademark). Alternatively, the processing device 5 and the article management system 100 may be configured to communicate with each other wirelessly based on a communication standard, such as Long Term Evolution (LTE), 4G, or 5G, for mobile phones.

A transmission timing of the identification information and the management information may be a time point at which the identification information is acquired by the processing device 5 (database D1), that is, in real time. Moreover, the processing device 5 may accumulate pieces of identification information and pieces of management information and may collectively transmit the pieces of information thus accumulated to the acquirer 11 by regularly performing batch processing.

Here, when the identification information and the management information are managed by only the management unit 12 (common database CD1), the identification information and the management information are transmitted in real time from the reading device 2 of each base P1 to the acquirer 11, and communication traffic tends to be enormous. In contrast, when one or more bases P1 are provided with the databases D1, each database D1 can, for example, temporarily accumulate the pieces of identification information and the pieces of management information to reduce the communication traffic, and this consequently provides the advantage that operation of the article management system 100 is facilitated.

Note that the fourth base P14 is not provided with the database D1 unlike the first base P11, the second base P12, the third base P13, and the fifth base P15. Thus, in the fourth base P14, the identification information read by the reading device 2 is transmitted to the acquirer 11 without being accumulated in the database D1 in association with the management information input to the reading device 2.

The management unit 12 is configured to manage the article 3 with reference to the identification information and the management information which are acquired by the acquirer 11 at each of the plurality of bases P1. The management unit 12 is a subject that executes a management step ST2 (see FIG. 8) described later. In the present embodiment, the management unit 12 includes the common database CD1 and stores the identification information and the management information in association with each other in the common database CD1. Thus, the common database CD1 stores, for each electronic tag 4 (i.e., article 3), management information in each base P1. In the present embodiment, the common database CD1 also stores article information on the article 3. That is, the management unit 12 manages the article information on the article 3 as the management information.

Moreover, in the present embodiment, the management unit 12 manages characteristic information on the electronic tag 4 in association with the identification information. The characteristic information is not information externally written into the electronic tag 4 but is information specific to the electronic tag 4 itself such as identification information. The characteristic information is, for example, the data rate (drive frequency) of the electronic tag 4.

As described above, the data rate (drive frequency) is specific information resulting from a material at the time of manufacturing the electronic tag 4. Thus, manufacturing a fake product of an electronic tag 4 such that the fake product has the same drive frequency as the electronic tag 4 is very difficult. For example, even when a fake product of an electronic tag 4 is manufactured with malicious intent such that the fake product has the same identification information as the electronic tag 4, it is difficult to imitate also the drive frequency. Therefore, the drive frequency can be effectively referenced for decision on whether the electronic tag 4 is authentic or fake.

The authenticator 13 decides whether the electronic tag 4 is authentic or fake by authenticating the electronic tag 4. Specifically, the authenticator 13 authenticates the electronic tag 4 with reference to the characteristic information (first characteristic information) managed by the management unit 12 and characteristic information (second characteristic information) read by the reading device 2. In the present embodiment, the reading device 2 estimates data rate (drive frequency) when reading the data transmitted from the electronic tag 4 as described above. That is, the reading device 2 is configured to read the characteristic information (here, drive frequency) on the electronic tag 4.

In the present embodiment, the characteristic information managed by the management unit 12 is the drive frequency read by the reading device 2 in the first base P11. That is, the characteristic information managed by the management unit 12 is information acquired from the electronic tag 4 at the time of manufacturing the electronic tag 4. In contrast, the characteristic information read by the reading device 2 is a drive frequency read by the reading device 2 at each base P1 (except for the first base P11).

Thus, if the characteristic information read from the electronic tag 4 by the reading device 2 matches the characteristic information acquired at the time of manufacturing the electronic tag 4, the authenticator 13 decides that the electronic tag 4 is an authentic product, and if the characteristic information read from the electronic tag 4 by the reading device 2 does not match the characteristic information acquired at the time of manufacturing the electronic tag 4, the authenticator 13 decides that the electronic tag 4 is a fake product.

The transmitter 14 transmits the identification information and the management information stored in the common database CD1 as update information to each base P1 via the network N1. The transmission destination of the update information is the processing device 5 (database D1) installed in each base P1. The processing device 5 which has received the update information updates the database D1 based on the update information. Thus, the latest information which the article management system 100 has can be shared between the bases P1.

Here, the update information includes the characteristic information (here, data rate (drive frequency)) on the electronic tag 4. For example, characteristic information read by the reading device 2 from an electronic tag 4 manufactured in the first base P11 is assumed to be stored in the common database CD1. In this case, the transmitter 14 transmits the characteristic information stored in the common database CD1 as the update information to the other bases P1 via the network N1. The characteristic information is desirably encoded in transmission of the characteristic information to the electronic tag 4 to the database D1 because the characteristic information can be used to decide whether the electronic tag 4 is authentic or fake. This provides the advantage that the reading device 2 which receives the characteristic information can grasp the data rate (drive frequency) of the electronic tag 4 in advance, so that the reading device 2 easily captures the data transmitted from the electronic tag 4.

(3) Operation

Operation of the article management system 100 of the present embodiment will be described below with reference to the drawings.

(3.1) Basic Operation

Figure 8:
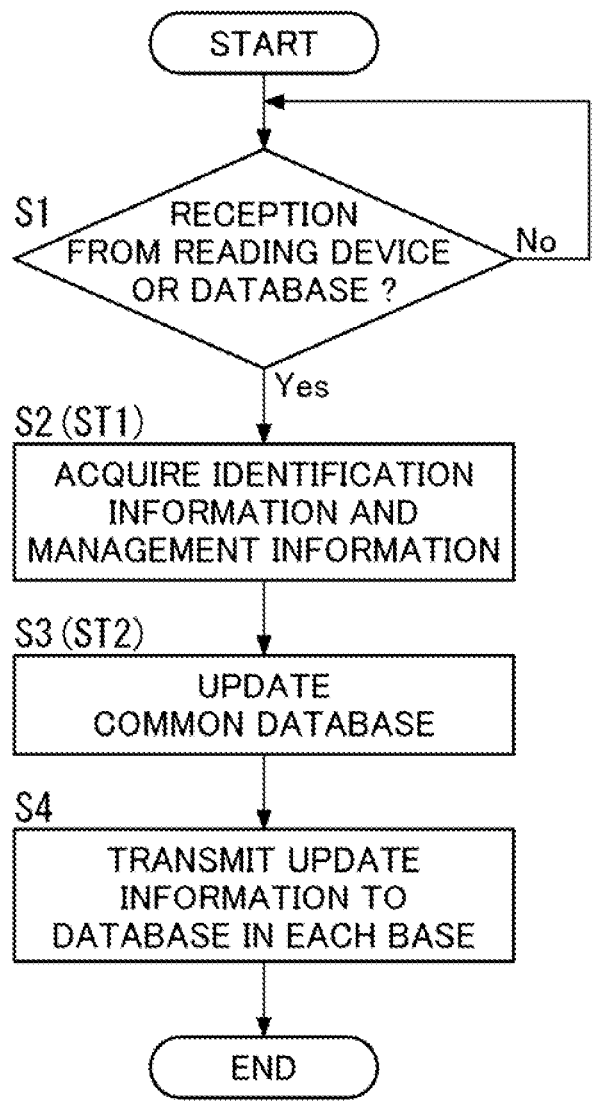
FIG. 8 is a flowchart of an example of operation of the article management system.

First, an example of a basic operation of the article management system 100 will be described with reference to FIG. 8. In the article management system 100, the acquirer 11 waits for a signal from the reading device 2 or the processing device 5 (database D1) of any one of the bases P1 (S1: No). Then, when receiving the signal from the reading device 2 or the processing device 5 of any one of the bases P1 (S1: Yes), the acquirer 11 acquires the identification information and the management information from the signal received (S2). The process S2 corresponds to the acquisition step ST1. Note that if the signal transmitted from the reading device 2 or the processing device 5 includes the characteristic information on the electronic tag 4, the acquirer 11 also acquires the characteristic information on the electronic tag 4 in addition to the identification information and the management information.

Then, the management unit 12 stores or overwrites the identification information and the management information acquired by the acquirer 11 in the common database CD1, thereby updating the common database CD1 (S3). The process S3 corresponds to the management step ST2. Thereafter, the transmitter 14 transmits the update information to the database D1 of each base P1 (S4). Hereafter, each time the article management system 100 receives the signal from the reading device 2 or the processing device 5 (database D1), the article management system 100 repeats the series of processes described above.

(3.2) Specific Example

Next, a flow in the distribution channel for the articles 3 to which the article management system 100 is applied will be described as a specific example with reference to FIG. 2. To simplify the description, operation of the transmitter 14 of the article management system 100 is omitted below.

First, the electronic tags 4 are manufactured in the manufacturing plant, which is the first base P11, for the electronic tags 4. During the manufacturing, pieces of identification information are written in the memory elements of the respective electronic tags 4.

After the pieces of identification information are written in the respective electronic tags 4, whether or not the pieces of identification information are readable from the respective electronic tags 4 by the reading device 2 is inspected in an inspection step. Whether or not each electronic tag 4 is a non-defective tag is thus inspected. In the inspection step, the reading device 2 reads the identification information and the data rate (drive frequency) from each electronic tag 4. The identification information thus read is associated with the drive frequency and is stored in the processing device 5 (first database D11) installed in the first base P11.

Then, the identification information and the drive frequency stored in the first database D11 are transmitted to the acquirer 11 of the article management system 100 via the network N1. The management unit 12 stores the identification information and the drive frequency acquired by the acquirer 11 in the common database CD1.

Next, the electronic tags 4 thus manufactured are transferred to, or sold to, a company which desires the electronic tags 4. The company which desires the electronic tags 4 may be the same company as, an affiliate company of, or a company having no relationship to, a company that operates the manufacturing plant for the electronic tags 4. Then, the electronic tags 4 are transported to the manufacturing plant (second base P12) for the articles 3 to which the electronic tags 4 are to be attached.

In the manufacturing plant, which is the second base P12, for the articles 3, the electronic tag 4 is affixed to each article 3, and thereby, the electronic tag 4 is attached to the article 3. After the electronic tag 4 is affixed to the article 3, whether or not the pieces of identification information are readable from the respective electronic tags 4 by the reading device 2 is inspected in the inspection step. In the inspection step, the reading device 2 reads the identification information and the data rate (drive frequency) from each electronic tag 4. The identification information and the drive frequency thus read are associated with the article information (e.g., JAN code) on the article 3 to which the electronic tag 4 is attached, and the identification information and the drive frequency are stored in the processing device 5 (second database D12) installed in the second base P12.

The processing device 5 installed in the second base P12 further associates information such as items based on the specification of the EPCIS with the identification information to obtain information, which is then stored as the management information. Then, the identification information, the drive frequency, and the management information stored in the second database D12 are transmitted to the acquirer 11 of the article management system 100 via the network N1.

The authenticator 13 authenticates the electronic tag 4 with reference to the drive frequency of the electronic tag 4 from the second database D12 (i.e., drive frequency from the manufacturing plant for the articles 3) and the stored drive frequency of the electronic tag 4 (i.e., the drive frequency from the manufacturing plant for the electronic tags 4). If the electronic tag 4 is an authentic product, the management unit 12 stores the identification information and the management information acquired by the acquirer 11 in the common database CD1, thereby updating the common database CD1. On the other hand, if the electronic tag 4 is a fake product, the management unit 12 notifies the manufacturing plant for the articles 3 of a warning. Thus, in the manufacturing plant for the articles 3, it is possible to determine whether or not the electronic tag 4 attached to each article 3 is transported in a correct route.

Next, the articles 3, to which the electronic tags 4 have been attached, are transported as a stock into a warehouse (third base P13). In the warehouse, which is the third base P13, the reading device 2 reads the identification information from the electronic tag 4 at the time of each article 3 entering the warehouse, and thereby, article arrival inspection of each article 3 is executed. In the article arrival inspection, the reading device 2 reads the identification information and the data rate (drive frequency) from each electronic tag 4. The identification information and the drive frequency thus read are stored in the processing device 5 (third database D13) installed in the third base P13.

The processing device 5 installed in the third base P13 further associes information such as items based on the specification of the EPCIS with the identification information to obtain information, which is then stored as the management information. Then, the identification information, the drive frequency, and the management information stored in the third database D13 are transmitted to the acquirer 11 of the article management system 100 via the network N1.

The authenticator 13 authenticates the electronic tag 4 with reference to the drive frequency of the electronic tag 4 from the third database D13 (i.e., drive frequency from the warehouse) and the stored drive frequency of the electronic tag 4 (i.e., the drive frequency from the manufacturing plant for the electronic tags 4). If the electronic tag 4 is an authentic product, the management unit 12 stores the identification information and the management information acquired by the acquirer 11 in the common database CD1, thereby updating the common database CD1. On the other hand, if the electronic tag 4 is a fake product, the management unit 12 notifies the warehouse of a warning. Thus, in the warehouse, it is possible to determine whether or not the electronic tag 4 attached to each article 3, for which the warning is notified, is transported in a correct route.

Next, the articles 3, to which the electronic tags 4 are attached, are purchased by a customer (here, a retail establishment) and are then transported to a business site or a transporting vehicle (fourth base P14) of a transport service provider. Here, the fourth base P14 is assumed to be a business site of a transport service provider. In the business site, which is the fourth base P14, the employee reads the identification information from each electronic tag 4 by the reading device 2. At that time, the reading device 2 reads the identification information and the data rate (drive frequency) from each electronic tag 4. The identification information and the drive frequency thus read are associated with the management information input to the reading device 2 by the employee and are transmitted via the network N1 to the acquirer 11 of the article management system 100.

The authenticator 13 authenticates the electronic tag 4 with reference to the drive frequency of the electronic tag 4 from the reading device 2 in the fourth base P14 (i.e., drive frequency from the business site of the transport service provider) and the stored drive frequency of the electronic tag 4 (i.e., the drive frequency from the manufacturing plant for the electronic tags 4). If the electronic tag 4 is an authentic product, the management unit 12 stores the identification information and the management information acquired by the acquirer 11 in the common database CD1, thereby updating the common database CD1. On the other hand, if the electronic tag 4 is a fake product, the management unit 12 notifies the business site of the transport service provider of a warning. Thus, in the business site of the transport service, it is possible to determine whether or not the electronic tag 4 attached to each article 3, for which the warning is notified, is transported in a correct route.

Next, the articles 3, to which the electronic tags 4 are attached, are then transported to the retail establishment (fifth base P15) which is a purchaser. In the retail establishment, which is the fifth base P15, the reading device 2 reads the identification information from the electronic tag 4 at the time of each of the articles 3 being delivered. The reading device 2 reads the identification information and the data rate (drive frequency) from the electronic tag 4. The identification information and the drive frequency thus read are stored in the processing device 5 (fourth database D14) installed in the fifth base P15.

The processing device 5 installed in the fifth base P15 further associates information such as items based on the specification of the EPCIS with the identification information to obtain information, which is then stored as the management information. Then, the identification information, the drive frequency, and the management information stored in the fourth database D14 are transmitted to the acquirer 11 of the article management system 100 via the network N1.

The authenticator 13 authenticates the electronic tag 4 based on the drive frequency of the electronic tag 4 from the fourth database D14 (i.e., drive frequency from the retail establishment) and the stored drive frequency of the electronic tag 4 (i.e., the drive frequency from the manufacturing plant for the electronic tags 4). If the electronic tag 4 is an authentic product, the management unit 12 stores the identification information and the management information acquired by the acquirer 11 in the common database CD1, thereby updating the common database CD1. On the other hand, if the electronic tag 4 is a fake product, the management unit 12 notifies the retail establishment of a warning. Thus, in the retail establishment, it is possible to determine whether or not the electronic tag 4 attached to each article 3, for which the warning is notified, is transported in a correct route.

(4) Variations

The embodiment described above is a mere example of various embodiments of the present disclosure. The embodiment described above may be modified in various aspects depending on design and the like as long as the object of the present disclosure is achieved. Moreover, a function similar to the article management system 100 may be implemented by an article management method, a (computer) program, a non-transitory storage medium in which a program is recorded, or the like.

An article management method according to an aspect of the present disclosure includes an acquisition step ST1 and a management step ST2. The acquisition step ST1 is a step of acquiring identification information and management information. The identification information is information read from the electronic tag 4 by the reading device 2 at each of the plurality of bases P1 in a distribution channel for the articles 3, the electronic tag 4 being attached to each article 3 and storing the identification information. The management information is information collected in association with the identification information at a corresponding one of the bases P1, the management information relating to management of the article 3. The management step ST2 is a step of managing the article 3 with reference to the identification information and the management information acquired in the acquisition step ST1 at each of the plurality of bases P1. Moreover, a program according to an aspect of the present disclosure is configured to cause one or more processors to execute the article management method.

Variations of the embodiment described above are enumerated below. The variations described below are applicable accordingly in combination.

In the article management system 100 in the present disclosure, for example, the acquirer 11, the management unit 12, and the like include computer systems. Each computer system includes a processor and memory as hardware as main components. The processor executes a program stored in the memory of each computer system, thereby implementing the function as the article management system 100 of the present disclosure. The program may be stored in the memory of the computer system in advance, may be provided over a telecommunications network, or may be provided as a non-transitory recording medium such as a memory card, an optical disc, or hard disk drive which stores the program and which is readable by the computer system. The processor of the computer system may be implemented as a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. The plurality of chips may be collected in one device or may be distributed in a plurality of devices. As mentioned herein, the computer system includes a microcontroller including one or more processors and one or more memory elements. Thus, the microcontroller also includes one or more electronic circuits including a semiconductor integrated circuit or a large-scale integrated circuit.

Moreover, collecting the plurality of functions of the article management system 100 in one housing is not an essential configuration of the article management system 100. The components of the article management system 100 may be distributed in a plurality of housings. Moreover, at least some functions of the article management system 100 may be realized by, for example, a server device, cloud (cloud computing), and the like.

In the embodiment described above, the plurality of correction bits CM are inserted each time 8-bit data is transmitted during the transmission of the data, but this aspect should not be construed as limiting. For example, the plurality of correction bits CB1 may be inserted at different locations in accordance with the types of the electronic tags 4 during the transmission of the data. In other words, the plurality of correction bits CB1 may be inserted in accordance with a communication protocol defined based on the characteristic of the coating-type tag (electronic tag 4) during the transmission of the data. For example, in an electronic tag 4, the plurality of correction bits CB1 are inserted each time 4-bit data is transmitted, and in another electronic tag 4, the plurality of correction bits CB1 are inserted each time 8-bit data is transmitted.

In the embodiment described above, the electronic tag 4 is not limited to the passive-type RF tag but may be in another aspect. That is, the electronic tag 4 is at least in an aspect in which the electronic tag 4 can wirelessly communicate with the reading device 2 by using induction field or a radio wave. The electronic tag 4 is preferably of a passive type in which the electronic tag 4 is activated in response to the radio wave received from the reading device 2. Moreover, the electronic tag 4 is preferably a coating-type tag formed by a coating method. When the electronic tag 4 is the coating-type tag, the electronic tag 4 preferably includes memory into which information is rewritable in a non-contact manner but does not have to have such memory.

In the embodiment described above, the authenticator 13 of the article management system 100 authenticates the electronic tag 4, but this aspect should not be construed as limiting. For example, the electronic tag 4 may be authenticated by the processing device 5 (database D1) disposed in each base P1. In this case, the article management system 100 does not have to include the authenticator 13.

In the embodiment described above, the database D1 disposed in each base P1 does not have to be updated with the latest information. In this case, the article management system 100 does not have to include the transmitter 14.

In the embodiment described above, the database D1 does not have to be disposed in each base P1. In this case, the acquirer 11 of the article management system 100 acquires the identification information and the management information from the reading device 2 in each base P1.

In the embodiment described above, the electronic tags 4 manufactured in the manufacturing plant for the electronic tags 4 are attached to the articles 3 manufactured in the manufacturing plant for the articles 3, but this aspect should not be construed as limiting. For example, in the manufacturing plant for the articles 3, the articles 3 may be manufactured with the electronic tags 4 printed thereon.

In the embodiment described above, the reading device 2 provided in each base P1 is not one of components of the article management system 100 but may be one of the components of the article management system 100. That is, the article management system 100 may further include the reading device 2 configured to read the identification information from each electronic tag 4.

In the embodiment described above, the reading device 2 may alone be put on a market. That is, the reading device 2 is to be applied to the article management system 100 and includes the reading unit 21 and the communicator 22.

In the embodiment described above, the article management system 100 is applied to management of each article 3 in the distribution channel for the articles 3, but this aspect should not be construed as limiting. For example, an object to which the article management system 100 is applied may be used to manage the article 3 which are moved between the plurality of points P1 in an identical building. For example, the article management system 100 is applicable to a dining room. Specifically, the electronic tag 4 is attached to a tray (the article 3) which is moved by being held by a customer with his/her hand. Then, while holding the tray, the customer moves between tables (points P1) at which food plates are served, and the customer places desired one or more food plates on the tray and then pays for the one or more food plates. In this case, one or more pieces of information on the one or more food plates put on the tray correspond to one or more pieces of management information.

That is, the article management system 100 includes the acquirer 11 and the management unit 12. The acquirer 11 is configured to acquire identification information and management information. The identification information is information read from the electronic tag 4 by the reading device 2 in each of a plurality of points P1 in the process in which the article 3 is moved, the electronic tag 4 being attached to the article 3 and storing the identification information. The management information is information collected in association with the identification information at a corresponding one of the points P1, the management information relating to management of the article 3. The management unit 12 is configured to manage the article 3 with reference to the identification information and the management information acquired by the acquirer 11 in each of the plurality of points P1.

(Summary)

As described above, an article management system (100) of a first aspect includes an acquirer (11) and a management unit (12). The acquirer (11) is configured to acquire identification information and management information. The identification information is information read from an electronic tag (4) by a reading device (2) in each of a plurality of bases (P1) in a distribution channel for an article (3), the electronic tag (4) being attached to the article (3) and storing the identification information. The management information is information collected in association with the identification information in a corresponding one of the plurality of bases (P1), the management information relating to management of the article (3). The management unit (12) is configured to manage the article (3) with reference to the identification information and the management information which are acquired by the acquirer (11) in each of the plurality of bases (P1).

This aspect has the advantage that convenience of management of the article (3) which is moved between the plurality of bases (P1) is easily improved by using the electronic tag (4).

In an article management system (100) of a second aspect referring to the first aspect, the management unit (12) is configured to manage characteristic information (first characteristic information) on the electronic tag (4) in association with the identification information.

This aspect has the advantage that whether or not the electronic tag (4) is authentic is easily decided by managing the characteristic information.

In an article management system (100) of a third aspect referring to the second aspect, the reading device (2) is configured to read characteristic information (second characteristic information) on the electronic tag (4) from the electronic tag. The article management system (100) further includes an authenticator (13). The authenticator (13) is configured to authenticate the electronic tag (4) with reference to the characteristic information (first characteristic information) managed by the management unit (12) and the characteristic information (second characteristic information) read by the reading device (2).

This aspect has the advantage that it is possible to determine whether or not the electronic tag (4) is transported in a correct route in the process in which the article (3) is moved.

In an article management system (100) of a fourth aspect referring to any one of the first to third aspects, the management unit (12) is configured to manage article information on the article (3) as the management information.

This aspect has the advantage that management is possible inclusively of specific contents of the article (3), such as the product type of the article (3).

In an article management system (100) according to a fifth aspect referring to any one of the first to third aspects, in at least one base (P1) of the plurality of bases (P1), a database (D1) is disposed. The database (D1) is configured to store the identification information and the management information collected in the corresponding one of the plurality of bases (P1). The acquirer (11) is configured to acquire the identification information and the management information in the corresponding one of the plurality of bases (P1) from the database (D1).

This aspect has the advantage that communication traffic is easily reduced compared to the case where the acquirer (11) acquires the identification information and the management information from each base P1 without using the database (D1).

In an article management system (100) according to a sixth aspect referring to any one of the first to fifth aspects, the electronic tag (4) is a coating-type tag.

This aspect has the advantage that manufacturing cost is reduced compared to the case where the electronic tag (4) is manufactured by a vacuum technology.

In an article management system (100) according to a seventh aspect referring to any one of the first to sixth aspects, the electronic tag (4) is configured to perform backscatter communication with the reading device (2).

This aspect has the advantage that power consumption by the electronic tag (4) is easily reduced.

In an article management system (100) of an eighth aspect referring to the seventh aspect, the backscatter communication adopts the following coding schema in transmission of a signal from the electronic tag (4) to the reading device (2). The coding schema is a schema that a disconnection time period (T11) for which an antenna (AT1) included in the electronic tag (4) is disconnected from a matching resistor (MAT1) is variable within a range greater than or equal to a connection time period (T12) for which the antenna (AT1) is connected to the matching resistor (MAT1).

This aspect has the advantage that electric power for driving the electronic tag (4) is less likely to be insufficient and operation of the electronic tag (4) is thus easily stabilized.

In an article management system (100) according to a ninth aspect referring to any one of the sixth to eighth aspects, the electronic tag (4) is configured to transmit a preamble (PR1) in transmitting data to the reading device (2). The reading device (2) includes a decider (211) configured to decide validity of the data transmitted from the electronic tag (4) in accordance with whether or not a period of the preamble (PR1) is within a predetermined range.

This aspect has the advantage that whether or not an electronic tag is the electronic tag (4) as an object to be read by the article management system (100) is easily decided.

In an article management system (100) according to a tenth aspect referring to any one of the sixth to ninth aspects, the electronic tag (4) is configured to transmit a preamble (PR1) in transmitting data to the reading device (2). The reading device (2) includes a determiner (212) configured to determine, based on a period of the preamble (PR1), a capturing timing of the data transmitted from the electronic tag (4).

This aspect has the advantage that the data transmitted from the electronic tag (4) can be read even when the reading device (2) cannot give an instruction on a data rate to the electronic tag (4).

In an article management system (100) according to an eleventh aspect referring to any one of the sixth to tenth aspects, the electronic tag (4) is configured to, while transmitting data to the reading device (2), transmit a plurality of correction bits (CB1) for correcting a capturing timing of the data.

This aspect has the advantage that timings at which the data transmitted from the electronic tag (4) is captured by the reading device (2) are less likely to be shifted from each other, and the accuracy of reading the data is thus easily improved.

In an article management system (100) of a twelfth aspect referring to the eleventh aspect, the plurality of correction bits (CB1) are inserted at different locations in accordance with a type of the electronic tag (4) during transmission of the data.

This aspect has the advantage that the accuracy of reading data is easily improved compared to the case where the plurality of correction bits (CB1) are uniformly inserted independently of the types of the electronic tag (4).

In an article management system (100) of a thirteenth aspect referring to the eleventh or twelfth aspect, the electronic tag (4) is configured to transmit a preamble (PR1) in transmission of the data to the reading device (2). The reading device (2) is configured to read, based on a bit sequence (BS1) between the preamble PR1 and a top correction bit (CB1) of the plurality of correction bits (CB1), a timing at which the plurality of correction bits (CB1) are inserted.

This aspect has the advantage that the reading device (2) is easily prevented from skipping reading of the plurality of correction bits (CB1).

In an article management system (100) according to a fourteenth aspect referring to any one of the sixth to thirteenth aspects, the reading device (2) is configured to perform communication based on a plurality of frame formats (FF1) according to a property of the electronic tag (4).

This aspect has the advantage that even when the data rate of the electronic tag (4) varies, the reading device (2) easily reads the data transmitted from the electronic tag (4).

An article management system (100) according to a fifteenth aspect referring to any one of the first to fourteenth aspects further includes the reading device (2) configured to read the identification information from the electronic tag (4).

This aspect has the advantage that convenience of management of the article (3) which is moved between the plurality of bases (P1) is easily improved by using the electronic tag (4).

A reading device (2) of a sixteenth aspect is to be applied to the article management system (100) of any one of the first to fourteenth aspect and includes a reading unit (21) and a communicator (22). The reading unit (21) is configured to read the identification information from the electronic tag (4). The communicator (22) is configured to transmit the identification information read by the reading unit (21) to the acquirer (11).

This aspect has the advantage that convenience of management of the article (3) which is moved between the plurality of bases (P1) is easily improved by using the electronic tag (4).

An article management system (100) of a seventeenth aspect includes an acquirer (11) and a management unit (12). The acquirer (11) is configured to acquire identification information and management information. The identification information is information read from an electronic tag (4) by a reading device (2) in each of a plurality of points (P1) in a process in which an article (3) is moved, the electronic tag (4) being attached to the article (3) and storing the identification information. The management information is information collected in association with the identification information in a corresponding one of the plurality of points (P1), the management information relating to management of the article (3). The management unit (12) is configured to manage the article (3) with reference to the identification information and the management information which are acquired by the acquirer (11) in each of the plurality of points (P1).

This aspect has the advantage that convenience of management of the article (3) which is moved between the plurality of points (P1) is easily improved by using the electronic tag (4).

An article management method of an eighteenth aspect includes acquiring identification information and management information (acquisition step ST1). The identification information is information read from an electronic tag (4) by a reading device (2) in each of a plurality of bases (P1) in a distribution channel for an article (3), the electronic tag (4) being attached to the article (3) and storing the identification information. The management information is information collected in association with the identification information in a corresponding one of the plurality of bases (P1), the management information relating to management of the article (3). The article management method further includes managing the article (3) with reference to the identification information and the management information acquired in the acquiring of the identification information and the management information in each of the plurality of bases (P1) (management step ST2).

This aspect has the advantage that convenience of management of the article (3) which is moved between the plurality of bases (P1) is easily improved by using the electronic tag (4).

A non-transitory computer-readable storage medium according to a nineteenth aspect is configured to store a program which causes one or more processors to execute the article management method of the eighteenth aspect.

This aspect has the advantage that convenience of management of the article (3) which is moved between the plurality of bases (P1) is easily improved by using the electronic tag (4).

The configurations of the second to fifteenth aspects are not essential configurations of the article management system (100) and may accordingly be omitted.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An article management system comprising:
an acquirer configured to acquire identification information and management information, the identification information being read from an electronic tag by a reading device in each of a plurality of bases in a distribution channel for an article, the electronic tag being attached to the article and storing the identification information, the management information being collected in association with the identification information in a corresponding one of the plurality of bases, the management information relating to management of the article, and
a management unit configured to manage the article with reference to the identification information and the management information which are acquired by the acquirer in each of the plurality of bases, wherein
the electronic tag is configured to perform backscatter communication with the reading device, and
the backscatter communication adopts a coding schema in transmission of a signal from the electronic tag to the reading device, the coding schema being a schema that a disconnection time period during which an antenna included in the electronic tag is disconnected from a matching resistor is variable within a range greater than or equal to a connection time period during which the antenna is connected to the matching resistor.

2. The article management system of claim 1, wherein the management unit is configured to manage first characteristic information on the electronic tag in association with the identification information.

3. The article management system of claim 2, wherein the reading device is configured to read second characteristic information on the electronic tag from the electronic tag, and
the article management system further includes an authenticator configured to authenticate the electronic tag with reference to the first characteristic information managed by the management unit and the second characteristic information read by the reading device.

4. The article management system of claim 1, wherein the management unit is configured to manage article information on the article as the management information.

5. The article management system of claim 1, wherein in at least one base of the plurality of bases, a database is disposed, the database being configured to store the identification information and the management information collected in the corresponding one of the plurality of bases, and
the acquirer is configured to acquire the identification information and the management information in the corresponding one of the plurality of bases from the database.

6. The article management system of claim 1, wherein the electronic tag is a coating-type tag.

7. The article management system of claim 6, wherein the electronic tag is configured to, while transmitting data to the reading device, transmit a plurality of correction bits for correcting a capturing timing of the data, and
the plurality of correction bits are inserted at different locations in accordance with a type of the electronic tag during transmission of the data.

8. The article management system of claim 6, wherein the electronic tag is configured to, while transmitting data to the reading device, transmit a plurality of correction bits for correcting a capturing timing of the data,
the electronic tag is configured to transmit a preamble in transmission of the data to the reading device, and
the reading device is configured to read, based on a bit sequence between the preamble and a top correction bit of the plurality of correction bits, a timing at which the plurality of correction bits are inserted.

9. The article management system of claim 6, wherein the reading device is configured to perform communication based on a plurality of frame formats according to a property of the electronic tag.

10. The article management system of claim 1, further comprising the reading device configured to read the identification information from the electronic tag.

11. A reading device to be applied to the article management system of claim 1, the reading device comprising:
a reading unit configured to read the identification information from the electronic tag; and
a communicator configured to transmit the identification information read by the reading unit to the acquirer.

12. An article management system comprising:
an acquirer configured to acquire identification information and management information, the identification information being read from an electronic tag by a reading device in each of a plurality of bases in a distribution channel for an article, the electronic tag being attached to the article and storing the identification information, the management information being collected in association with the identification information in a corresponding one of the plurality of bases, the management information relating to management of the article, and
a management unit configured to manage the article with reference to the identification information and the management information which are acquired by the acquirer in each of the plurality of bases, wherein
the electronic tag is a coating-type tag,
the electronic tag is configured to transmit a preamble in transmitting data to the reading device, and
the reading device includes a decider configured to decide validity of the data transmitted from the electronic tag in accordance with whether or not a period of the preamble is within a predetermined range.

13. A reading device to be applied to the article management system of claim 12, the reading device comprising:
a reading unit configured to read the identification information from the electronic tag; and
a communicator configured to transmit the identification information read by the reading unit to the acquirer.

14. An article management system comprising:
an acquirer configured to acquire identification information and management information, the identification information being read from an electronic tag by a reading device in each of a plurality of bases in a distribution channel for an article, the electronic tag being attached to the article and storing the identification information, the management information being collected in association with the identification information in a corresponding one of the plurality of bases, the management information relating to management of the article, and
a management unit configured to manage the article with reference to the identification information and the management information which are acquired by the acquirer in each of the plurality of bases, wherein
the electronic tag is a coating-type tag,
the electronic tag is configured to transmit a preamble in transmitting data to the reading device, and the reading device includes a determiner configured to determine, based on a period of the preamble, a capturing timing of the data transmitted from the electronic tag.

15. A reading device to be applied to the article management system of claim 14, the reading device comprising:
a reading unit configured to read the identification information from the electronic tag; and
a communicator configured to transmit the identification information read by the reading unit to the acquirer.

* * * * *